United States Patent [19]

Higo

[11] 4,077,004
[45] Feb. 28, 1978

[54] FAULT LOCATION SYSTEM FOR A REPEATERED PCM TRANSMISSION SYSTEM

[75] Inventor: Yoshiki Higo, Tokyo, Japan

[73] Assignee: Nippon Electric Company, Ltd., Tokyo, Japan

[21] Appl. No.: 665,760

[22] Filed: Mar. 11, 1976

[30] Foreign Application Priority Data

Mar. 18, 1975 Japan .................................. 50-32756

[51] Int. Cl.² ............................................ H04N 17/02
[52] U.S. Cl. ......................................... 325/2; 325/13; 178/71 T
[58] Field of Search ............... 325/2, 13, 1; 178/71 T, 178/69 A, 69 B, 69 G

[56] References Cited

U.S. PATENT DOCUMENTS

| | | | |
|---|---|---|---|
| 3,491,298 | 1/1970 | De Jager et al. | 325/13 |
| 3,500,202 | 3/1970 | Zegers | 325/13 |
| 3,798,544 | 3/1974 | Norman | 325/13 |
| 3,906,174 | 9/1975 | Dotter | 178/69 R |

*Primary Examiner*—Benedict V. Safourek
*Assistant Examiner*—Michael A. Masinick
*Attorney, Agent, or Firm*—Sughrue, Rothwell, Mion, Zinn and Macpeak

[57] ABSTRACT

A PCM fault location system for repeaters and a code generator used therefor employ fault location codes generated on the basis of pseudo-random codes. The PCM fault location system transmits the codes through a repeatered transmission line, and the fault location codes including repeater transmission errors are received by the repeaters. A component of the repeater-designation frequency signal is extracted from the received fault location codes by means of a particular repeater-built-in fault locating circuit, and the thus extracted repeater-designation frequency component is received at a transmitting point of the fault location codes. The code generator employed at the transmitting point includes first means for obtaining codes which have an appropriate and sufficient difference in an average number of occurrences of digits "1" and "0" and are constructed using at least one series of pseudo-random codes, second means for controlling the state of the codes obtained by the first means in accordance with a repeater-designation frequency signal, and third means for performing differential code-conversion of the codes obtained by the second means.

16 Claims, 4 Drawing Figures

FAULT LOCATION SYSTEM FOR A REPEATERED PCM TRANSMISSION SYSTEM

BACKGROUND OF THE INVENTION

The present invention relates to a fault system for a group of repeaters forming a repeatered PCM transmission system.

A repeatered PCM transmission system is basically composed of unit repeatered transmission lines and two monitoring stations terminating both ends of a transmission line. The unit repeatered transmission line consists of a plurality of repeaters cascade-connected with transmission line-sections. These plural repeaters are located at appropriate intervals and installed generally into unattended manholes. The output signals from the circuits are transmitted to the transmission monitoring station via a communication line different from the unit repeatered transmission lines such as represented, for example, by an interstitial pair. In the above-described fault location system, the transmission monitoring station transmits location codes including a center frequency component of the band-pass filter for designating a particular repeater, and the position of fault and the state of fault are diagnosed by analyzing the signals containing the fault information which are extracted by the circuit for that exclusive purpose built into each repeater and which are then sent back therefrom.

In the repeatered PCM transmission system in general, if a fault occurs in the system, a reception monitoring station detects the fault in the unit repeatered transmission line and, the line is immediately switched to a stand-by repeatered transmission line to maintain normal system operation. Simultaneously, a transmission monitoring station commences a fault location process for locating where in the repeater group including the transmission line-sections the fault has arisen with respect to the faulty line switched off.

The fault location process is carried out through a remote control operation because a group of repeaters are installed at unattended points remote from the monitoring stations. Accordingly, each of a plurality of repeaters is provided with a circuit for the exclusive use of the fault location, and a band-pass filter whose center pass-band frequency is designed to be different from one repeater to another is included in the circuit.

As a typical example of the PCM repeater fault location systems, a built-in frequency divider (flip-flop circuit in the case of twin pulse use to be described later in detail) system employing the fault location codes basically consisting of a plurality of periodic twin pulse groups as disclosed in FIG. 3 of an article titled "PCM-400M Digital Repeatered Line" on pp. 24–11 – 24–15 of "Conference Record," Vol. 3 published in *INTERNATIONAL CONFERENCE ON COMMUNICATIONS*, San Francisco, California, June 16-18, 1975 (Reference 1) has been proposed heretofore.

This frequency divider system with the above-mentioned circuit can realize an excellent fault location system of high precision using the built-in frequency divider, so that it is capable of sensing even a small repeater transmission error, because the transmission error is sent back as a phase inversion or an amplitude attenuation of a repeater-designation frequency component extracted by the circuit. However, this system is not adaptable to a fault location system for use in a high speed repeater transmission system since a plurality of the periodic pulse groups must be employed as the fault location signal as shown in FIG. 3(A) in Reference 1. More particularly, as is well-known, the repeater transmission errors in a high speed system are mainly caused by the intersymbol-interference caused between the transmitted codes, and the rate of the error is largely affected by the construction of the codes to be repeated and transmitted. For instance, in the case of using a plurality of the periodic pulse groups as the fault location codes, the error rate obtained by the use of the location codes is greatly different from that observed in practical repeatered transmission signals of a random nature because the fault location codes are constructed using periodic codes having non-random nature.

As a result, the great difference between the error rates monitored in the practical transmission and obtained with the fault locating process in a high speed system makes a fault locating process impossible to perform the normal operation. This shortcoming in the prior art system is hereinafter called "off-line effect".

SUMMARY OF THE INVENTION

It is, therefore, an object of the present invention is to provide a PCM fault location system for repeaters and a code generator used therefor that is free from the above-mentioned shortcomings unavoidable in the prior art system by employing fault location codes generated on the basis of pseudo-random codes in place of periodic codes.

The present PCM fault location system for repeaters employs output codes of a code generator which are transmitted through a repeatered transmission line as fault location codes, said code generator comprising first means for obtaining codes which have an appropriate and sufficient difference in an average number of occurrences of digits "1" and "0" and are constructed by using at least one series of pseudo-random codes, second means for controlling the state of the codes obtained by the first means in accordance with a repeater-designation frequency signal, and third means for performing differential code-conversion of the codes obtained by the second means. And in the present system, the fault location codes including repeater transmission errors are received by repeaters, a component of the repeater-designation frequency signal is extracted from said received fault location codes by means of a particular repeater-built-in fault locating circuit including an additional code-converter, and the thus extracted repeater-designation frequency component is received at a transmitting point of the fault location codes, whereby the fault location of the repeatered transmission line may be achieved.

Thus, the great technological difference between the present fault location system and the conventional system proposed in Reference 1 exists in the formation of the employed fault location codes, but both systems are based on the same fault locating principle. As a result, they adopt the same construction of the repeater-built-in fault location circuit. However, an additional code-converter used in the present system corresponds to the ½ frequency divider in the conventional system, and therefore, the frequency division ratio is restricted to ½.

BRIEF DESCRIPTION OF THE DRAWINGS

The present invention will now be described in more detail in conjunction with the accompanying drawings, in which.

DESCRIPTION OF THE PREFERRED EMBODIMENTS

Figure 1:
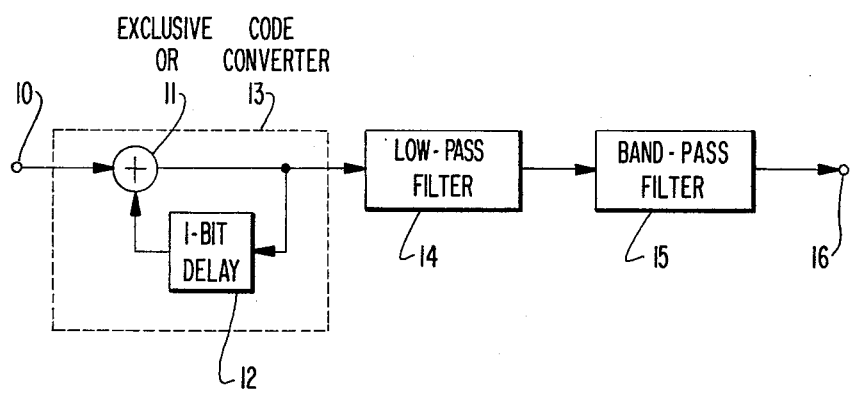
FIG. 1 shows a block diagram of the structure of a repeater-built-in fault location circuit used in a present fault location system.

A repeater-built-in fault location circuit including an additional code-converter as shown in FIG. 1 is provided to every repeater for the purpose of the fault location. This fault location circuit consists of an additional code-converter 13 with the summing function based on modulo 2 composed of an exclusive OR circuit 11 having an input terminal 10 and a 1-bit delay circuit 12, a low-pass filter 14, and a band-pass filter 15 having an output terminal 16. The input terminal 10 is connected to a point corresponding to an output terminal of the repeater to receive fault location codes transmitted from a transmission monitoring station (not shown) including repeater transmission errors. The code transformation rule of the converter 13 is represented by the following logical expression (1):

$$B_n = A_n \oplus B_{n-1} \tag{1}$$

where the reference letter $A_n$ represents a code appearing at the input terminal 10, the reference letter $B_n$ represents a code appearing at the output terminal of the exclusive OR circuit 11, that is, at the output terminal of the converter 13, the suffix letter $n$ represents a time slot number, and the symbol $\oplus$ represents an exclusive OR operation. As a result, the above-described converter 13 can usually be realized with only a flip-flop in which its output state is reversed each time a digit "1" is applied to its input. The low-pass filter 14 is a filter for attenuating high frequency components of the output codes of the converter 13, and the filter 14 extracts the component of the repeater-designation frequency contained in the received fault location codes. The band-pass filter 15 is a filter designed to allow a signal to appear at the output terminal 16 only when the repeater-designation frequency component extracted by the low-pass filter 14 is equal to its center frequency. The center frequencies of the band-pass filters 15 installed at each of the plurality of repeaters are different from one repeater to another so that the repeater-designation frequency component contained in the transmitted fault location codes appears at the output terminal 16 of the filter 15 in only one designated repeater. The terminal 16 is connected to a communication line (not shown) represented by an interstitial pair, and the repeater-designation frequency component containing the repeater transmission error information which has passed through the band-pass filter 15 is sent back to the transmission monitoring station. In general, the repeater-designation frequency $f_i$ is determined depending upon the transmitting information capacity of the communication line such as the interstitial pair.

The formation of the output codes of the additional code-converter 13 (i.e., the fault location codes appearing after the additional code-conversion) in order that the repeater-designation frequency component may be extracted by the low-pass filter 14, is appropriately and simply obtained by the superposition of the repeater-designation frequency component on the used codes by means of the density modulation technique which is realized in the code generation control according to the repeater-designation frequency signal in view of the fact that the codes are two-level codes.

In general, a transmission clock frequency $f_o$ and the repeater-designation frequency $f_i$ satisfy the relation of $f_o >> f_i$ so that the component of the repeater-designation frequency $f_i$ is represented by an average occurrence probability of the mark "1" in the transmission code sequence operating at the transmission clock frequency $f_o$. Therefore, the simplest density modulation is to alternately change the mark rates of the codes during a period of $(2f_i)^{-1}$, and consequently, this becomes the simplest condition imposed on the fault location codes appearing after the additional code-conversion. In contrast, in the system disclosed in Reference 1, the aforementioned condition is realized by the difference in pulse numbers of a plurality of periodic pulse groups.

Since the fault location codes employed in the present fault location system satisfy the above-mentioned condition, and also, since the codes generated on the basis of pseudo-random codes are employed, the above-described off-line effect is extremely mitigated.

Figure 2:
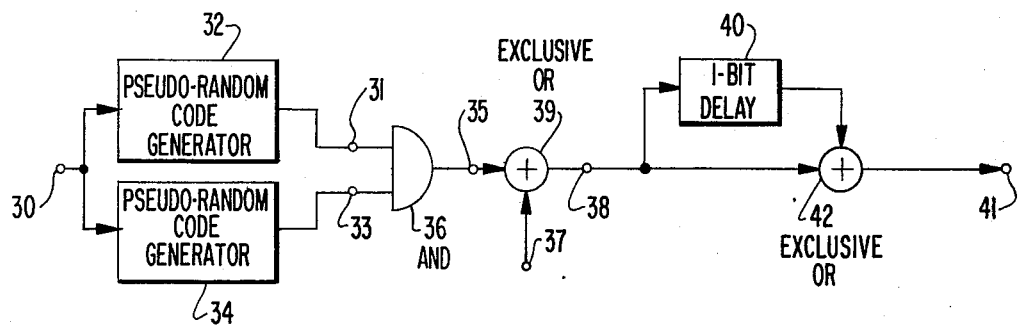
FIG. 2 shows a block diagram of one example of a code generator for generating fault location codes used in the present invention.

In FIG. 2 which shows a block diagram of one example of the fault location code generator used in the present fault location system, in which the first means as referred to in the introductory part of this specification is realized by two pseudo-random code generators 32 and 34 and an AND circuit 36, the second means is realized by an exclusive OR circuit 39, and the third means by a 1-bit delay circuit 40 and an exclusive OR circuit 42.

Figure 3:
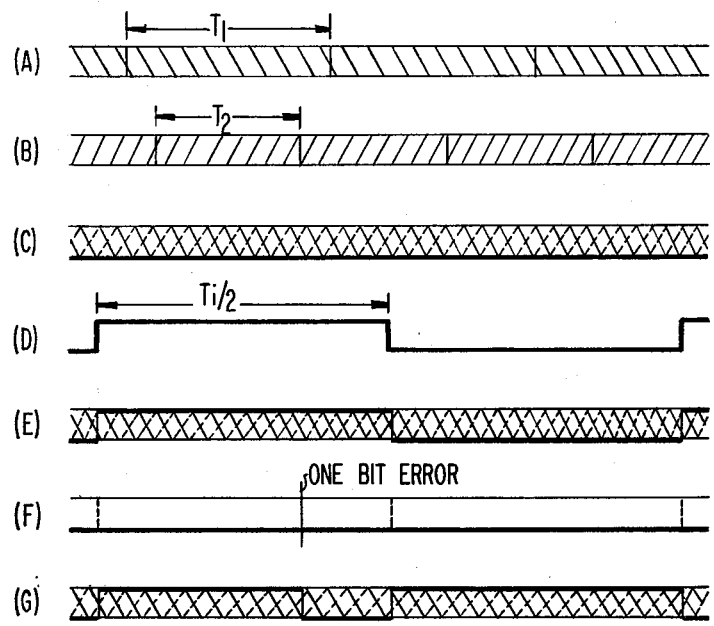
FIG. 3 shows a timing chart for explaining the formation of codes appearing at the respective points in the present fault location system.

Now, the process of generation of the fault location codes will be described with reference to FIGS. 2 and 3.

The above-mentioned pseudo-random code generators 32 and 34 are generally available ones such as, for example, PN sequence generators as fully described in DIGITAL COMMUNICATIONS WITH SPACE APPLICATIONS, pp. 165–172 published in 1964 by Prentice-Hall, Inc. (Reference 2), which are formed of $m_1$-stage and $m_2$-stage shift registers, respectively, to generate pseudo-random codes having $2^{m_1}-1$ bits and $2^{m_2}-1$ bits, respectively. The transmission clock frequency $f_o$ is applied to a clock input terminal 30 connected to the code generators 32 and 34. Also, two series of pseudo-random code sequences which operate at the clock frequency $f_o$ whose frame repetition periods are $T_1 = (2^{m_1}-1)^{-1} \times f_o^{-1}$ and $T_2 = (2^{m_2}-1)^{-1} \times f_o^{-1}$, respectively, and whose average mark rates during the periods of $T_1$ and $T_2$, respectively, are 50% are obtained at their output terminals 31 and 33 shown in FIGS. 3(A) and 3(B). The AND circuit 36 carries out the logical AND operation for the two pseudo-random codes obtained at the output terminals 31 and 33, respectively, and codes having a mark rate of 25% as shown in FIG. 3(C) are obtained at an output terminal 35 of the AND circuit 36 because the mark rates of the two series of the pseudo-random codes are 50%. Here, it is to be noted that the relationship between the numbers of stages $m_1$ and $m_2$ of the shift registers can be chosen freely. If an OR circuit is used in place of the AND circuit 36, codes of a mark rate of 75% can be obtained at its output terminal 35. The exclusive OR circuit 39 executes the logical exclusive OR operation between the codes having the mark rate (hereinafter referred to generally as $k$) of 25% appearing at the output terminal 35 and codes at the other input terminal 37. As a result, when the code appearing at the input terminal 37 is "1", the codes of $k = 25\%$ appearing at the output terminal 35 are changed to codes of the mark rate of 75% (this means that the digits "1" and "0" of the codes of $k = 25\%$ are changed to their complementary digits "0" and "1", respectively), whereas when the code appearing at the input terminal 37 is "0", the codes of $k = 25\%$ appearing at the output terminal 35 are not changed and are derived at an output terminal 38 of the circuit 39 as controlled to be the codes of the mark rate of 25%. For this reason, in the case where codes having alternate "1" and "0" for every $T_i/2$ period (FIG. 3(D)) are applied to the input terminal 37, processed codes having the occurrence probability of digit "1" of 75% (equal to the mark rate 75%) are obtained in every other $T_i/2$ period as shown in FIG. 3(E). Thus, the codes of the mark rate 25% or 75% appear at the output terminal 38 repeatedly in every $T_i/2$ period. These codes obtained at the output terminal 38 (as shown in FIG. 3(E)) basically satisfy the requirement for the code formation imposed on the codes appearing at the output of the converter 13 in the repeater-built-in fault location circuit as explained with reference to FIG. 1. In this case, it is only necessary to meet the requirement that the period $T_i$ be equal to $f_i^{-1}$. If the codes obtained from the output terminal 38 are fed to a repeatered transmission line as fault location codes without any code conversion, they will be code-converted by the additional code-converter 13, and as a result, the basic condition for the code formation will be lost. The previously mentioned third means is a code conversion means which causes the digits of the codes appearing at the output terminal 38 to change to their complementary digits but makes the codes coincide basically with the output codes of the converter 13. The third means carries out the inverse transformation of the converter 13, that is, differential code-conversion based on modulo 2, and is composed of a 1-bit delay circuit 40 and an exclusive OR circuit 42. The transformation rule of the differential code-converter is represented by the following logical equation (2):

$$b_n = a_n \oplus a_{n-1} \qquad (2)$$

where the reference letter $a_n$ represents an input code, the reference letter $b_n$ represents an output code, the suffix letter $n$ represents a time slot number, and the symbol $\oplus$ represents an exclusive logical OR operation. Accordingly, when the mark rate of $a_n$ sequence (i.e., = $k$) is 25%, it is clear from the equation (2) that at an output terminal 41 of the code generator are obtained codes of the mark rate of 37.5%. FIG. 3(F) shows the code sequence of the mark rate 37.5%, and this code sequence forms the fault location codes of the present fault location system. In the case of $a_n$ sequence of $k = 75\%$, though the digits of the codes in FIG. 3(F) are changed to their complementary digits with respect to the fault location capability, it is equivalent to $a_n$ sequence of $k = 25\%$. Although explanation was given in connection with the example shown in FIG. 2 assuming that $a_n$ sequence of $k = 25\%$ or 75%, reference letter $k$ can be set at appropriate values by employing three or more series of pseudo-random codes. In addition, even if one series of the random codes is employed and a second and subsequent series of the pseudo-random codes are obtained by giving a delay time to the first series, with respect to the mark rate $k$, the code are equivalent to the case where two or more independent series are employed.

The fault location codes obtained at the output terminal 41 are transmitted and repeated in the fault location process and are derived at the input terminal 10 of the fault location circuit as shown in FIG. 1. Between the terminal 41 and the terminal 10 exist the following two equivalent code transformations. The first one is the transformation of two-level codes into repeatered transmission line codes represented by bipolar codes. However, in general, the inverse transformation for the first code transformation can be simply achieved in each repeater, and for instance, in the case of the bipolar code transformation, it can be realized by subjecting the output codes of two two-level decision circuits to the logical OR operation or by transforming into two levels through a folding back operation. Therefore, after all, it is considered that the code transformation was not performed. In addition, upon transformation from two-level codes into the transmission line codes as in the case of the bipolar code transformation, if an additional code-converter is involved, it is functionally off-set by a differential code-converter within a fault location code generator used in the present invention and thus, it can be omitted. A second equivalent code transformation is a repeater transmission error. This cannot be negligible and is represented by E, and the fault location codes including the errors received at the repeater is represented by $C_n$. Thus, the transformation showing the repeater transmission error is represented by the following logical equation (3):

$$C_n = b_n \oplus E \qquad (3)$$

Therefore, the code $B_n$ obtained at the output of the converter 13 can be represented by the following equation (4) on the basis of the logical equations (1), (2) and (3) and assuming $C_n$ equal to $A_n$:

$$B_n = B_o \oplus (a_o \oplus a_1) \oplus (a_1 \oplus a_2) \oplus \oplus (a_{n-1} \oplus a_n) \oplus E \qquad (4)$$

From the equation (4), the following equation (5) is obtained on the basis of the fact of $a_j \oplus a_j$ equal to 0:

$$B_n = B_o \oplus a_o \oplus a_n \oplus E \qquad (5)$$

In the equation (5), $B_o \oplus a_o$ is determined by the initial condition and if the result is "1", $B_n$ becomes equal to $\overline{a_n \oplus E}$, (Symbol (−) superposed on $a_n$ represents the inversion), while if the result is "0", $B_n$ is equal to $a_n \oplus E$. In other words, in the case where no repeater transmission error is found, the output codes of the converter 13 are either entirely consistent or entirely inconsistent with the codes appearing at the output terminal 38 rather than the output terminal 41. Thus, the initial condition determines whether the output codes of the converter 13 take the codes shown in FIG. 3(E) or their complementary codes. If an error of 1 bit should occur in the fault location codes as shown by the line in FIG. 3(F), it is obvious from the equation (5) that the digits of the output codes the converted 13 are changed to their complementary digits at and after the time point of the 1-bit error occurrence as shown in FIG. 3(G).

Figure 4:
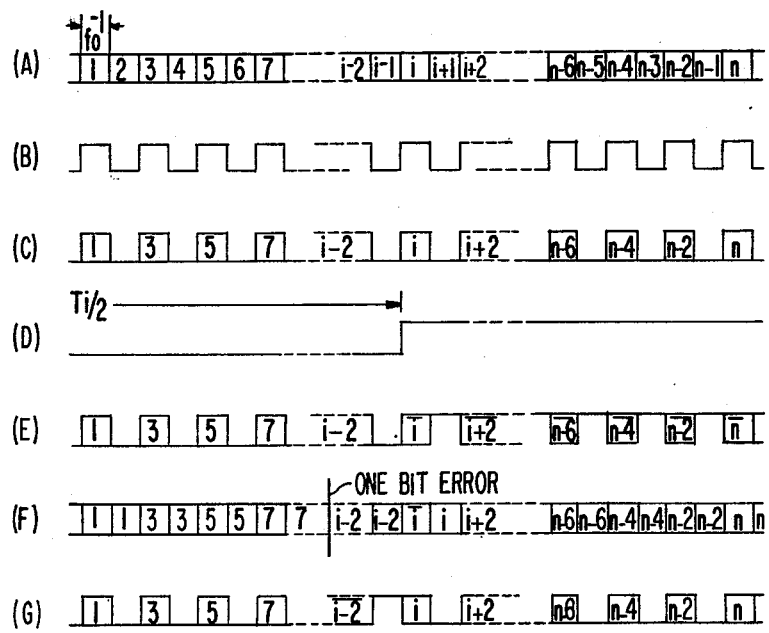
FIG. 4 shows a timing chart for explaining the formation of codes appearing at the respective points in a modified fault location system in which one of the pseudo-random code generators of FIG. 2 is replaced by a clock generator having a frequency of $f_o/2$.

A clock generator having a frequency $f_c/2$ in place of the pseudo-random code generator 34 of FIG. 2 may be employed for the same purpose in an alternative embodiment. In FIG. 4 which shows a timing chart of each point of the structure of FIG. 2 in this case, FIG. 4(A) shows the pseudo-random code series in greater detail and the sequence of numerals inscribed therein is a series of time slot numbers given to the code series for convenience. In FIG. 4(B), a clock signal of a frequency $f_o/2$ to be applied to the other input terminal of the AND circuit 36 is shown. Accordingly, at the output terminal 35 is obtained codes as shown in FIG. 4(C), which is formed by setting every other bit (digit) of the codes in FIG. 4(A) in a "0" state. In these codes obtained at the output terminal 35 and shown in FIG. 4(C), the mark rate of the codes at every other bit is 50% as described above, while it is constantly "0" in the other time slots. Therefore, during a given long period, the mark rate of 25% is obtained. If an OR circuit is used in place of the AND circuit 36 in the codes shown in FIG. 4(C), the constant "0" at every other bit is changed to a constant "1", and therefore, the mark rate becomes 75%. Accordingly, codes (as shown in FIG. 4(E)) whose digits are equal to complementary digits of the codes of $k = 25\%$ appearing at the output terminal 35 for every $T_i/2$ period in FIG. 4(E) (the complementary code is represented by depicting (−) superposed on the time slot numbers), that is, codes having the alternated 25% and 75% marks are obtained at the output terminal 38. These codes are obtained at the terminal 38 and shown in FIG. 4(E) also basically satisfy the code condition imposed on the output codes of the converter 13 in the repeater-built-in fault location circuit of FIG. 1. For this reason, at the output terminal 41 of this code generator are obtained codes having two code sequence of the same digit construction observed at alternate bit positions, except that the digits of the two code sequences are different from each other as indicated by letters i and i of FIG. 4(F) at the changing point of the signal (the repeater-designation frequency signal as shown in FIG. 4(D)). The mark rate of the codes obtained in the above-mentioned manner is 50%, and these codes serve as the above-mentioned fault location codes. Therefore, in this case, at the output terminal 38 of the additional code-converter 13 are obtained codes as shown in FIG. 4(G), whose digits are changed to their complementary digits during a time from the point of generation of a repeater-transmission error to a time from the point before the time slot number i appears.

In the case where the codes shown in FIG. 3(E), 3(G), 4(E) or 4(G) are supplied as input codes to the low-pass filter 14 of the fault location circuit of FIG. 1, it is entirely similar to the disclosure in Reference 1 that a repeater-designation frequency component, that is, a repeater-designation frequency signal in which the number of the repeater transmission errors are correlated to the number of phase inversions is obtained at the output terminal 16, that only one repeater transmission error occurring within the period of $f_1^{-1}$ is detected and that the level of the extracted repeater-designation frequency component depends on the mark rate $k$. However, the difference between the system of the present invention and that disclosed in Reference 1 is found in the formation of the fault location codes as is apparent from the foregoing. As shown in FIG. 3(F) or 4(F), the fault location codes of the present system are non-periodic codes generated on the basis of the pseudo-random codes, so that it is obvious that the above-mentioned off-line effect is extremely reduced thereby.

Especially, in a super high-speed repeated transmission system of the order of newly developed PCM-400 M System as disclosed in Reference 1, the off-line effect is very large. For this reason, the realization of the present fault location system brings about a great improvement in high precision fault location and eventually realizes the high reliability of the system.

In the above-mentioned description, although the relationship $T_i = f_i^{-1}$ has been maintained, as another method, a signal obtained by coding a repeater-designation frequency signal with a delta-modulation coder may be used as the input codes given at the input terminal 37. Since this delta-modulation coding is based on the density modulation of a clock signal in accordance with an input analog signal, it has such nature that the coded signal can be decoded with a simple integrater (that is, a low-pass filter) to obtain the input analog signal, and, consequently, that the polarity inversion of the output codes correspond to that of the decoded analog signal. Therefore, if this coding is utilized in the present fault location system, "1" and "0" of the coded output signal is represented as the difference in the mark rate of the codes appearing at the output terminal 35, and except for this, the previously described fault location principle can be maintained. Accordingly, the use of the repeater-designation frequency signal coded by the delta-modulation coder as the input codes at the input terminal 37 is fully included in the subject matter of the present invention.

It will be apparent that a number of modifications and alternatives may be made within the scope of the present invention defined by the appended claims.

What is claimed is:

1. A fault location system for a repeatered PCM transmission system comprising:

a first means for transmitting through a repeatered transmission line fault location codes based on pseudo-random codes, said fault location codes being capable of code conversion into codes having their two states controllable in response to a repeater-designation frequency signal, one of said two states having the occurrence probability of the digit "1" equal to $k$ sufficiently greater or smaller than 0.5 while the other of the two states has the occurrence probability of the digit "1" equal to $(1-k)$, said first means including a first pseudo-random code generator having a frame repetition period $$T_1 = (2^{m_1} - 1)^{-1} \times f_o^{-1}$$

where $m_1$ is the number of stages of said first generator and $f_o$ is a clock frequency, a second code generator having a frame repetition rate which differs from $T_1$, gate means for logically combining the outputs of said first and second code generators, complementing means for selectively controlling the change of the digits of the combined codes from said gate means to their complementary digits in response to the repeater-designation frequency signal, and conversion means for performing differential code-conversion of the codes obtained from said complementing means;

a second means disposed at a designated repeater for receiving the fault location codes including repeater transmission errors;

a third means for extracting a component of the repeater-designation frequency signal from the received fault location codes by means of a fault locating circuit built into the repeater and including an additional code-converter; and a fourth means for receiving said extracted repeater-designation frequency signal component at a transmitting point of the fault location codes, whereby the fault location for the repeatered transmission line is achieved.

2. A fault location system as recited in claim 1 wherein said second code generator is a pseudo-random code generator having a frame repetition period $$T_2 = (2^{m_2} - 1)^{-1} \times f_o^{-1}$$

where $m_2$ is the number of stages of said second generator and $m_1 \neq m_2$.

3. A fault location system as recited in claim 1, wherein said second code generator is a clock generator having a frequency $f_o/2$.

4. A fault location system as recited in claim 1, wherein said gate means is an AND gate.

5. A fault location system as recited in claim 1, wherein said gate means is an OR gate.

6. A fault location system as recited in claim 1, wherein said complementing means is an exclusive OR circuit connected to receive as one input the output of said gate means and as the other input said repeater-designation frequency signal.

7. A fault location system as recited in claim 1, wherein said conversion means comprises:
a 1-bit delay connected to the output of said complementing means; and
an exclusive OR circuit connected to receive as one input the output of said complementing means and as the other input the output of said 1-bit delay.

8. A fault location system as recited in claim 1, wherein said additional code converter in said third means comprises:
a 1-bit delay connected to the output of said second means; and
an exclusive OR circuit connected to receive as one input the output of said second means and as the other input the output of said 1-bit delay.

9. In a fault location system for a repeatered PCM transmission system including a first means for transmitting through a repeatered transmission line fault location codes, said fault location codes being capable of code conversion into codes having their two states controllable in response to a repeater-designation frequency, a second means disposed at a designated repeater for receiving the fault location codes including repeater transmission errors, a third means for extracting a component of the repeater-designation frequency signal from the received fault location codes by means of a fault locating circuit built into the repeater and including an additional code-converter, and a fourth means for receiving said extracted repeater-designation frequency signal component at a transmitting point of the fault location codes, the improvement wherein the fault location codes are based on pseudo-random codes and one of said two states of said codes having the occurrence probability of the digit "1" equal to $k$ sufficiently greater or smaller than 0.5 while the other of the two states has the occurrence probability of the digit "1" equal to $(1-k)$, said first means being a code generator comprising:
fifth means for generating the codes having the occurrence probability of the digit "1" equal to $k$ by means of at least one series of pseudo-random codes;
sixth means for controlling the change of the digits of said codes to their complementary digits in response to the repeater-designation frequency signal; and
seventh means for performing differential code-conversion of the codes obtained by the second means.

10. A code generator as recited in claim 9, wherein said sixth means is an exclusive OR circuit connected to receive as one input the output of said fifth means and as the other input said repeater-designation frequency signal.

11. A code generator as recited in claim 9, wherein said seventh means comprises:
a 1-bit delay connected to the output of said sixth means; and
an exclusive OR circuit connected to receive as one input the output of said sixth means and as the other input the output of said 1-bit delay.

12. A code generator as recited in claim 9, wherein said fifth means comprises:
a first pseudo-random code generator having a frame repetition period $$T_1 = (2^{m_1} - 1)^{-1} \times f_o^{-1}$$

where $m_1$ is the number of stages of said first generator and $f_o$ is a clock frequency;
a second code generator having a frame repetition rate which differs from $T_1$; and
gate means for logically combining the outputs of said first and second code generators.

13. A code generator as recited in claim 12, wherein said second code generator is a pseudo-random code generator having a frame repetition period $$T_2 = (2^{m_2} - 1)^{-1} \times f_o^{-1}$$

where $m_2$ is the number of stages of said second generator and $m_1 \neq m_2$.

14. A code generator as recited in claim 12, wherein said second code generator is a clock generator having a frequency $f_o/2$.

15. A code generator as recited in claim 12, wherein said gate means is an AND gate.

16. A code generator as recited in claim 12, wherein said gate means is an OR gate.

* * * * *

UNITED STATES PATENT OFFICE
CERTIFICATE OF CORRECTION

Patent No. 4,077,004      Dated February 28, 1978

Inventor(s)    Yoshiki HIGO

It is certified that error appears in the above-identified patent and that said Letters Patent are hereby corrected as shown below:

Column 6, line 52 - delete "$a_n$" insert -- $\bar{a}_n$ --

Column 7, line 37 - delete "i" (second occurrence) insert -- $\bar{\imath}$ --

Signed and Sealed this

Eighteenth Day of July 1978

[SEAL]

Attest:

RUTH C. MASON  
*Attesting Officer*

DONALD W. BANNER  
*Commissioner of Patents and Trademarks*